Patented Feb. 11, 1930

1,746,736

UNITED STATES PATENT OFFICE

WILFRED M. MURCH, OF HAMBURG, NEW YORK, ASSIGNOR TO NATIONAL ANILINE & CHEMICAL CO., INC., OF NEW YORK, N. Y., A CORPORATION OF NEW YORK

PRODUCTION OF P-CHLORBENZOYL-O-BENZOIC ACID

No Drawing.   Application filed November 6, 1925. Serial No. 67,434.

This invention relates to the manufacture and production of p-chlorbenzoyl-o-benzoic acid.

The production of p-chlorbenzoyl-o-benzoic acid by the condensation of phthalic anhydride with monochlorbenzene in the presence of aluminum chloride at temperatures from about 110° C. to or just below the boiling point of the mixture is well known.

According to the present invention, it has been found that superior yields of p-chlorbenzoyl-o-benzoic acid can be obtained by carrying out the condensation at temperatures considerably below those heretofore proposed, for example, at temperatures below and not to exceed about 100° C., preferably about 90° C. As the temperature of condensation is raised above about 90° C. to 110° C. or higher, the yield of p-chlorbenzoyl-o-benzoic acid decreases and the yield of by-products increase.

The invention will be further illustrated by the following specific example, but it will be understood that the invention is not limited thereto. The parts are by weight.

*Example.*—To a well-stirred mixture of 125 parts phthalic anhydride and 600 parts of monochlorbenzene at an initial temperature of about 30° C., there is added 250 parts of anhydrous aluminum chloride at such a rate that the temperature of the mixture does not rise above 60°–65° C. After all of the aluminum chloride has been added, the mixture is heated and maintained at a temperature of about 75°–80° C. for an hour or until evolution of hydrogen chloride has substantially ceased. When the reaction is complete, the mixture is slowly added, with stirring, to a solution of about 420 parts of sodium carbonate in 4800 parts of water which is at a temperature of about 90° C. Considerable heat and carbon dioxide are evolved, and large quantities of chlorbenzene may distil off. The mixture is then treated with a current of steam, using external heat if necessary to keep the volume of mixture approximately constant, until the excess chlorbenzene is removed by distillation. The remaining solution is then filtered, the residue washed free from alkali, and the filtrate, at a temperature of about 25°–30° C., made acid by the slow addition of the necessary quantity (about 150–155 parts) of 66° Bé. sulfuric acid. After stirring for an hour or so, the precipitated p-chlorbenzoyl-o-benzoic acid, having the probable formula

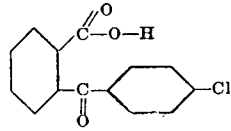

is filtered off, washed and dried in any suitable manner.

It will be understood that the proportions of materials, the temperatures, and the manner of mixing the ingredients may be varied somewhat from those given in the example without departing from the spirit and scope of the invention. For example, the amount of chlorbenzene employed may vary from about 400 to 1000 or more parts, the amount of aluminum chloride from about 245 to 260 parts, and the condensation temperature from about 30° C. to about 90° C., preferably about 50° to 90° C., or still better, from about 60° to 85° C. At the lower temperatures, from about 30° to 50° C., the reaction will take place but is too slow for practical purposes while at higher temperatures, from about 90° C. to the boiling-point of the mixture, p-chlorbenzoyl-o-benzoic acid is produced in decreasing amounts, particularly at about 100° C. and above. The by-products formed are mostly, if not all, insoluble in an aqueous solution of sodium carbonate while p-chlorbenzoyl-o-benzoic acid is soluble. In the above example, sufficient sodium carbonate is employed to dissolve the p-chlorbenzoyl-o-benzoic acid and produce an alkaline solution, p-chlorbenzoyl-o-benzoic acid is practically insoluble in water or dilute acids.

I claim:

1. In the production of p-chlorbenzoyl-o-benzoic acid by the condensation of phthalic anhydride with monochlorbenzene in the presence of anhydrous aluminum chloride, a process which comprises carrying out the condensation at a temperature of about 50° to 90° C.

2. In the production of p-chlorbenzoyl-o- benzoic acid by the condensation of phthalic anhydride with monochlorbenzene in the presence of anhydrous aluminum chloride, a process which comprises carrying out the condensation at a temperature of about 60° to 85° C.

3. In the production of p-chlorbenzoyl-o-benzoic acid by the condensation of phthalic anhydride with monochlorbenzene in the presence of anhydrous aluminum chloride, a process which comprises carrying out the condensation at a temperature of 75° to 80° C.

4. In the production of p-chlorbenzoyl-o-benzoic acid by the condensation of phthalic anhydride with an excess of monochlorbenzene in the presence of anhydrous aluminum chloride, a process which comprises carrying out the condensation at a temperature not higher than about 90° C., subsequently adding the reaction-mixture to an aqueous solution containing an excess of sodium carbonate, distilling off the excess chlorbenzene in a current of steam, filtering the remaining solution, and acidifying the filtrate to precipitate chlorbenzoyl-o-benzoic acid therefrom.

5. In the production of p-chlorbenzoyl-o-benzoic acid, a process which comprises condensing phthalic anhydride with monochlorbenzene in the presence of anhydrous aluminum chloride at temperatures of about 30° to 90° C.

6. In the production of p-chlorbenzoyl-o-benzoic acid, a process which comprises condensing phthalic anhydride with monochlorbenzene in the presence of anhydrous aluminum chloride at a temperature not higher than about 90° C.

In testimony whereof I affix my signature.

WILFRED M. MURCH.